(12) United States Patent
Lee (10) Patent No.: US 8,823,780 B2
(45) Date of Patent: Sep. 2, 2014

(54) LIQUID CRYSTAL IMAGE DISPLAY DEVICE WITH SYNCHRONIZED BACKLIGHT

(75) Inventor: Juyoung Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 650 days.

(21) Appl. No.: 12/903,630

(22) Filed: Oct. 13, 2010

(65) Prior Publication Data
US 2011/0205344 A1 Aug. 25, 2011

(30) Foreign Application Priority Data
Feb. 19, 2010 (KR) .................. 10-2010-0015335

(51) Int. Cl.
| | | |
|---|---|---|
| *H04N 13/04* | (2006.01) | |
| *H04N 5/05* | (2006.01) | |
| *G02F 1/13* | (2006.01) | |
| *G09G 3/00* | (2006.01) | |
| *G02B 27/02* | (2006.01) | |
| *G02B 27/22* | (2006.01) | |
| *G09G 3/36* | (2006.01) | |

(52) U.S. Cl.
CPC ........ *G02B 27/2264* (2013.01); *G09G 2310/08* (2013.01); *G09G 2340/0435* (2013.01); *G09G 3/003* (2013.01); *G09G 2320/0252* (2013.01); *H04N 13/0438* (2013.01); *G09G 2310/0237* (2013.01); *G09G 2320/0261* (2013.01); *G09G 3/36* (2013.01)
USPC .................. 348/51; 348/55; 348/56

(58) Field of Classification Search
CPC . G02F 1/13; G02F 1/1336; G09G 2340/0435; G09G 2320/064; G09G 2320/0238; G09G 2320/0247; G09G 2320/0252; G09G 2310/061; G09G 2310/063; G09G 2310/065; G02B 27/024; G02B 27/026; H04N 13/0452; H04N 13/0497; H04N 2213/002; H04N 7/087; H04N 7/088
USPC ................................. 348/51, 55, 56
See application file for complete search history.

(56) References Cited

U.S. PATENT DOCUMENTS

| | | | | |
|---|---|---|---|---|
| 3,439,113 | A | * | 4/1969 | Walker .......................... 380/222 |
| 4,321,623 | A | * | 3/1982 | Rzeszewski ................... 348/481 |

(Continued)

FOREIGN PATENT DOCUMENTS

| | | | |
|---|---|---|---|
| KR | 10-2010-0019347 A | 2/2010 | |
| WO | WO 2009051603 A1 * | 4/2009 | ............... G09G 3/36 |

OTHER PUBLICATIONS

Korean Office Action (Application No. 10-2010-0015335), dated May 30, 2013.

*Primary Examiner* — Dave Czekaj
*Assistant Examiner* — David N Werner
(74) *Attorney, Agent, or Firm* — Morgan, Lewis & Bockius LLP (57) ABSTRACT

An image display device comprises a liquid crystal display panel configured to selectively implement 2D images and 3D images, panel driving circuits configured to drive the liquid crystal display panel, a backlight configured to include a plurality of light sources and supply light to the liquid crystal display panel, and a controller configured to modulate input data to generate frame data synchronized with N (where N is a positive integer equal to or more than 2) multiple frame frequency, control the panel driving circuits such that the frame data is displayed in the liquid crystal display panel, expand a vertical blank interval where the frame data is not displayed, and control a turned-on period of the backlight to overlap with the expanded vertical blank interval.

7 Claims, 6 Drawing Sheets

(56) References Cited

U.S. PATENT DOCUMENTS

| | | | |
|---|---|---|---|
| 4,701,795 A * | 10/1987 | Andrews et al. | 348/516 |
| 5,045,950 A * | 9/1991 | Iwamura et al. | 386/202 |
| 6,055,020 A * | 4/2000 | Lorenz et al. | 348/473 |
| 6,122,000 A * | 9/2000 | Yee et al. | 348/51 |
| 6,268,889 B1 * | 7/2001 | Koori | 348/642 |
| 7,050,698 B1 * | 5/2006 | Quan | 386/254 |
| 7,215,356 B2 * | 5/2007 | Lin et al. | 348/51 |
| 8,441,430 B2 * | 5/2013 | Lee | 345/102 |
| 2006/0056809 A1 * | 3/2006 | Quan | 386/94 |
| 2008/0143876 A1 * | 6/2008 | Kouramanis et al. | 348/553 |
| 2009/0009508 A1 * | 1/2009 | Koo et al. | 345/214 |
| 2009/0251531 A1 * | 10/2009 | Marshall et al. | 348/42 |
| 2010/0033461 A1 | 2/2010 | Hasegawa et al. | |
| 2010/0033555 A1 * | 2/2010 | Nagase et al. | 348/43 |
| 2010/0141741 A1 * | 6/2010 | Choi | 348/51 |
| 2011/0175978 A1 * | 7/2011 | Ito | 348/43 |

\* cited by examiner

LIQUID CRYSTAL IMAGE DISPLAY DEVICE WITH SYNCHRONIZED BACKLIGHT

This application claims the priority and the benefit of Korea Patent Application No. 10-2010-15335 filed on Feb. 19, 2010, the entire contents of which is incorporated herein by reference for all purposes as if fully set forth herein.

BACKGROUND

1. Field

This document relates to an image display device capable of selectively implementing two-dimensional flat images (hereinafter, referred to as "2D images") and three-dimensional stereoscopic images (hereinafter, referred to as "3D images").

2. Related Art

An image display device implements 3D images using a stereoscopic technique and an autostereoscopic technique.

The stereoscopic technique uses binocular parallax images which are great in the stereoscopic effect. The stereoscopic technique has a type of using glasses and a type of not using glasses, and, at present, the two types have been put into practical use. In the type of not using glasses, the stereoscopic images are implemented by dividing optical axes of binocular parallax images, by using optical plates such as parallax barriers provided at front and rear surfaces of a display panel. In the type of using glasses (hereinafter, referred to as a "glasses type"), binocular parallax images are displayed on a direct view display panel or a projector by changing polarization directions or in the temporal division manner, and polarization glasses or liquid crystal shutter glasses are used to implement stereoscopic images.

The glasses type is greatly classified into a first polarization filter type using a pattern retarder film and polarization glasses, a second polarization filter type using a switching liquid crystal layer and polarization glasses, and a liquid crystal shutter glasses type. The first and second polarization filter types have a low transmittance of 3D images due to the pattern retarder film or the switching liquid crystal layer which functions as a polarization filter and formed in a liquid crystal display panel.

The liquid crystal shutter glasses type implements 3D images by alternately displaying a left eye image and a right image on a display device by the frame unit, and opening and closing the left and right eye shutters of the liquid crystal shutter glasses in synchronization with the display timing. In the liquid crystal shutter glasses, only the left eye shutter is opened for the n-th frame period when the left eye image is displayed, and only the right eye shutter is opened for the (n+1)-th frame period when the right eye image is displayed, thereby generating the binocular parallax in a temporal division manner.

In order to selectively implement 3D images and 2D images, the latest image display device mainly employs a hold type display device such as a liquid crystal display ("LCD"). The LCD maintains data which has been charged for the previous frame period due to the response time of the liquid crystal which is relatively low, till new data is written therein.

When 3D images are implemented by the image display device, due to the response time delay characteristic of the liquid crystal, 3D crosstalk of a ghost pattern can be viewed for a time when the left eye image is changed to the right eye image or the right eye image is changed to the left eye image. A principle by which the 3D crosstalk is viewed will be described in outline.

If it is assumed that the left eye shutter of the liquid crystal shutter glasses is opened for the n-th frame period and the right eye shutter of the liquid crystal shutter glasses is opened for the (n+1)-th frame period, in the LCD, left eye image data is sequentially addressed for the n-th frame period and right eye image data is sequentially addressed for the (n+1)-th frame period. When the left eye shutter of the liquid crystal shutter glasses is being opened, a portion of pixels (pixels placed in the lower part of the panel, which lies in the latter addressing order) where the left eye image data for the n-th frame has not been written yet maintains the right eye image data which has already been written for the (n−1)-th frame period. Therefore, a viewer's left eye views a portion of the right eye image for the (n−1)-th frame along with the left eye image for the n-th frame in an overlapping manner. In addition, when the right eye shutter of the liquid crystal shutter glasses is being opened, a portion of pixels (pixels placed in the lower part of the panel, which lies in the latter addressing order) where the left eye image data for the (n+1)-th frame has not been written yet maintains the left eye image data which has already been written for the n-th frame period. Therefore, a viewer's right eye views a portion of the left eye image for the n-th frame along with the right eye image for the (n+1)-th frame in an overlapping manner.

In addition, when 2D moving pictures are implemented by the image display device, due to the maintaining characteristic of the liquid crystal, there may be occurrence of a motion blurring that a screen is not clear and appears blurred. In order to remove the motion blurring, it is necessary to improve a moving picture response time ("MPRT").

SUMMARY

Embodiments of this document provide an image display device capable of improving a display quality.

According to an exemplary embodiment of this document, there is provided an image display device comprising a liquid crystal display panel configured to selectively implement 2D images and 3D images; panel driving circuits configured to drive the liquid crystal display panel; a backlight configured to include a plurality of light sources and supply light to the liquid crystal display panel; and a controller configured to modulate input data to generate frame data synchronized with N (where N is a positive integer equal to or more than 2) multiple frame frequency, control the panel driving circuits such that the frame data is displayed in the liquid crystal display panel, expand a vertical blank interval where the frame data is not displayed, and control a turned-on period of the backlight to overlap with the expanded vertical blank interval.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, embodiments of this document will be described with reference to FIGS. 1 to 6. Like reference numerals designate like elements throughout the specification.

Figure 1:
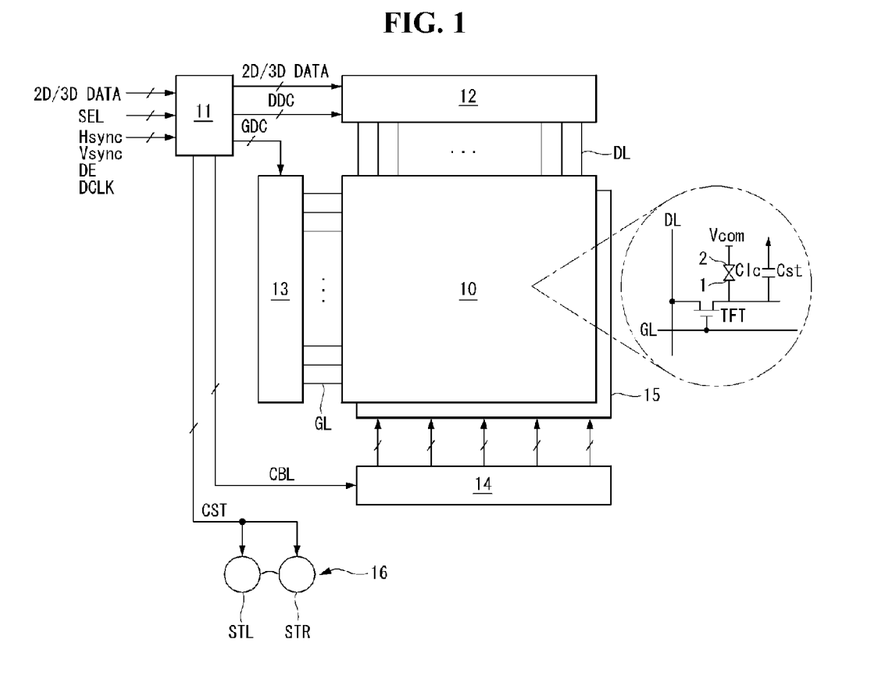
FIG. 1 is a block diagram illustrating an image display device according to an embodiment of this document.

FIG. 1 shows an image display device according to an embodiment of this document.

In FIG. 1, the image display device comprises a liquid crystal display panel 10, a controller 11, a data driver 12, a gate driver 13, a light source driver 14, a backlight unit 15, and liquid crystal shutter glasses 16. The data driver 12 and the gate driver 13 constitute a panel driving circuit.

The liquid crystal display panel 10 comprises two glass substrates and a liquid crystal layer interposed therebetween. The lower glass substrate of the liquid crystal display panel 10 is provided with a plurality of data lines DL and a plurality of gate lines GL intersecting the data lines DL. The liquid crystal display panel 10 is provided with liquid crystal cells Clc which are formed at the intersections of the data lines DL and the gate lines GL and arranged in a matrix. In addition, the lower glass substrate of the liquid crystal display panel 10 is provided with TFTs (thin film transistors), and pixel electrodes 1 and storage capacitors Cst connected to the TFTs. Black matrices, color filters, and common electrodes 2 are formed on the upper glass substrate of the liquid crystal display panel 10. The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. Polarizers are respectively attached to the outer surfaces of the lower and upper glass substrate of the display panel 10. In addition, alignment layers are formed on the inner surfaces having contact with the liquid crystal layer to set pretilt angles of the liquid crystal layer.

The data driver 12 comprises a plurality of data drive ICs. Each of the data drive ICs comprises a shift register for sampling clock signals, a register which temporarily stores digital data output from the controller 11, a latch which stores the amount of one line data in response to clock signals from the shift register and outputs the amount of one line data at a time, a digital/analogue converter which selects positive/ negative gamma voltages by referring to a gamma reference voltage corresponding to the digital data values from the latch, multiplexers which select data lines DL which are applied with the analogue data converted as the positive/ negative gamma voltages, and output buffers connected between the multiplexers and the data lines DL. The data driver 12 converts 2D and 3D data synchronized with a frame frequency of f (input frame frequency)×N (where N is a positive integer equal to or more than 2), into analogue data voltages for supply to the data lines DL.

The gate driver 13 comprises a plurality of gate drive ICs. Each of the gate drive ICs comprises a shift register, a level shifter which converts an output signal from the shift register to have a swing range suitable to drive the TFTs of the liquid crystal cells, and output buffers. The gate driver 13 sequentially outputs scan pulses (or gate pulses) synchronized with the frame frequency of f×N Hz for supply to the gate lines GL.

The light source driver 14 generates a driving power for turning on light sources. The light driver 14 supplies the driving power to the light sources at a specific cycle under the control of the controller 11.

The backlight unit 15 is turned on for a preset specific time to supply light to the liquid crystal display panel 10 and is turned off during the remaining time period, and repeats such turning-on and turning-off at a specific cycle. The backlight unit 15 comprises a plurality of light sources which are turned on depending on the driving power supplied from the light source driver 14, a light guide plate (or a diffusion plate), a plurality of optical sheets, and the like. The backlight unit 15 may be implemented by a direct type or an edge type. The light sources may comprise any one or more of HCFL (Hot Cathode Fluorescent Lamp), CCFL (Cold Cathode Fluorescent Lamp), EEFL (External Electrode Fluorescent Lamp), and LED (Light Emitting Diode).

The liquid crystal shutter glasses 16 comprise a left eye shutter STL and a right eye shutter STR which are electrically controlled independently from each other. Each of the left eye shutter STL and the right eye shutter STR comprises a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is applied with a reference voltage, and the second transparent electrode is applied with ON and Off voltages. Under the control of the controller 11, each of the left eye shutter STL and the right shutter STR transmits light from the liquid crystal display panel 10 when the ON voltage is applied to the second transparent electrode, whereas it block light from the liquid crystal display panel 10 when the OFF voltage is applied to the second transparent electrode.

The controller 11 is supplied with timing signals and 2D and 3D data from a video source (not shown). The timing signals includes a vertical synchronizing signal Vsync, a horizontal synchronizing signal Hsync, a data enable signal DE, a dot clock DCLK, and so forth.

The controller 11 multiplies the input frame frequency f by N to generate a frame frequency (hereinafter, referred to as an "N multiple frame frequency") Nf and generates display panel control signals DDC and GDC, a light source control signal CBL, and a liquid crystal shutter control signal CST with respect to the frame frequency.

The display panel control signals DDC and GDC include a data control signal for controlling an operation timing of the data driver 12 and a gate control signal GDC for controlling an operation timing of the gate driver 13. The data control signal DDC includes a source start pulse SSP, a source sampling clock SSC, a source output enable signal SOE, a polarity control signal POL, and so on. The gate control signal GDC includes a gate start pulse GSP, a gate shift clock GSC, a gate output enable signal GOE, and the like. The light source control signal CBL controls the light driver 14 such that the light sources of the backlight unit 15 are turned on and off at a specific cycle. The liquid crystal shutter control signal CST enables the left eye shutter STL and the right eye shutter STR of the liquid crystal shutter glasses 16 to be alternately opened and closed at a specific cycle.

The controller 11 selects either the 2D data or the 3D data supplied from the video source in response to a selection signal SEL and modulates it to be synchronized with the N multiple frame frequency Nf. When selecting the 2D data, the controller 11 may modulate the data through the data interpolation. When selecting the 3D data, the controller 11 may modulate the data through the data division. The controller 11 can reduce a time taken to write frame data by expanding a vertical blank interval and increasing data transmission frequency. Also, the controller 11 may control the light source driver 14 such that a turned-on period of the light sources overlaps with an expanded blank interval.

Hereinafter, the image display device according to various embodiments of this document will be described in detail with reference to FIGS. 2 to 6. Here, the embodiments will be described by exemplifying a case where "N" is 2, that is, a case where the frame frequency is 120 Hz when the input frame frequency is 60 Hz. In FIGS. 4 and 6, the reference numerals "A" denotes original 2D data, the reference numeral "A'" denotes interpolated 2D data, and the reference numerals "L" and "R" denote 3D left eye data and 3D right eye data, respectively.

Figure 2:
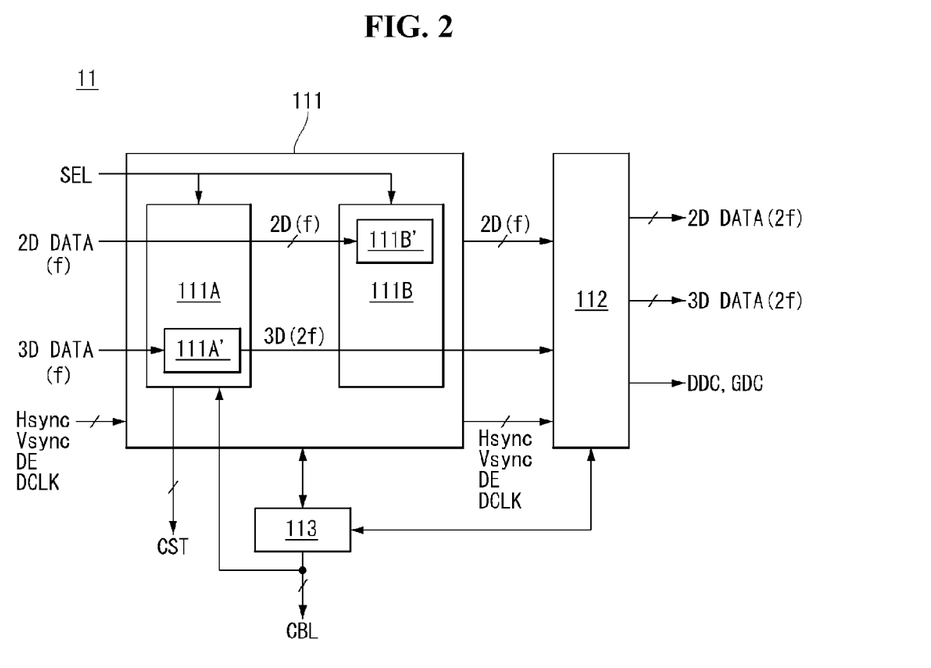
FIG. 2 is a block diagram illustrating a controller.

FIG. 2 shows the controller 11.

In FIG. 2, the controller 11 comprises a data processing unit 111, a timing controller 112, and a light source control unit 113.

The data processing unit 111 modulates input 2D and 3D data to be synchronized with the double frame frequency $2f$. For this, the data processing unit 111 comprises a 3D data processing unit 111A, and a 2D data processing 111B.

The 3D data processing unit 111A blocks the 2D data and processes and outputs the 3D data in response to a first logic level of the selection signal SEL, whereas it blocks the 3D data and by-passes the input 2D data to the 2D data processing unit 111B in response to a second logic level of the selection signal SEL.

When processing the input 3D data, the data processing unit 111A divides the input 3D data into left eye data and right eye data by using a 3D division unit 111A', thereby outputting double 3D data synchronized with the double frame frequency $2f$. In addition, when processing the input 3D data, the data selection unit 111A determines frames based on counted values of the timing signal such as the vertical synchronizing signal Vsync or the like, and generates the liquid crystal shutter control signal CST for alternately opening and closing the left eye shutter STL and right eye shutter STR of the liquid crystal shutter glasses 16 at a cycle of two frame periods. Particularly, by referring to logic levels of the light source control signal CBL, the data processing unit 111A controls the liquid crystal shutter control signal CST such that the opening and closing of the shutters STL and STR can be decided at the same time while the light sources are turned off.

The 2D data processing unit 111B bypasses the double 3D data output from the 3D data processing unit 111A to the timing controller 112 in response to the first logic level of the selection signal SEL. In addition, responsive to the second logic level of the selection signal SEL, the 2D data processing unit 111B processes and outputs the 2D data which has been bypassed from the 3D data processing unit 111A.

When processing the input 2D data, the 2D data processing unit 111B interpolates the input 2D data by using a data interpolation unit 111B' and outputs double 2D data synchronized with the double frame frequency $2f$. For interpolation of the data, the data interpolation unit 111B' inserts interpolated frame data into every interval between neighboring input frame data by referring to a memory (not shown).

The timing controller 112 rearranges the double 2D data and the double 3D data which are selectively output from the data processing unit 111, to be suitable for the resolution of the liquid crystal display panel 10 so as to be supplied to the data driver 12. Also, the timing controller 112 generates the display panel control signals DDC and GDC synchronized with the double frame frequency $2f$ based on the timing signals Vsync, Hsync, DE and DCLK, thereby controlling operations of the drivers 12 and 13. The timing controller 112 may modulate the data enable signal DE to widen the vertical blank interval and modulates the dot clock DCLK to increase the data transmission frequency. The modulation for the data enable signal DE and the dot clock DCLK may be carried out by an external system board (not shown).

The light source control unit 113 outputs the light source control signal CBL for controlling the turning-on and turning-off of the light sources. The light source control unit 113 reverses logic levels of the light source control signal CBL based on the timing signals Vsync, Hsync, DE and DCLK. The light source control unit 113 outputs the light source control signal CBL with a high level to turn on the light sources so as to overlap with the vertical blank interval, preferably, during the vertical blank interval, and outputs the light source control signal CBL with a low level to turn off the light sources during the remaining periods. The light source control unit 113 may be embedded in the data processing unit 111 or the timing controller 112.

Figure 3:
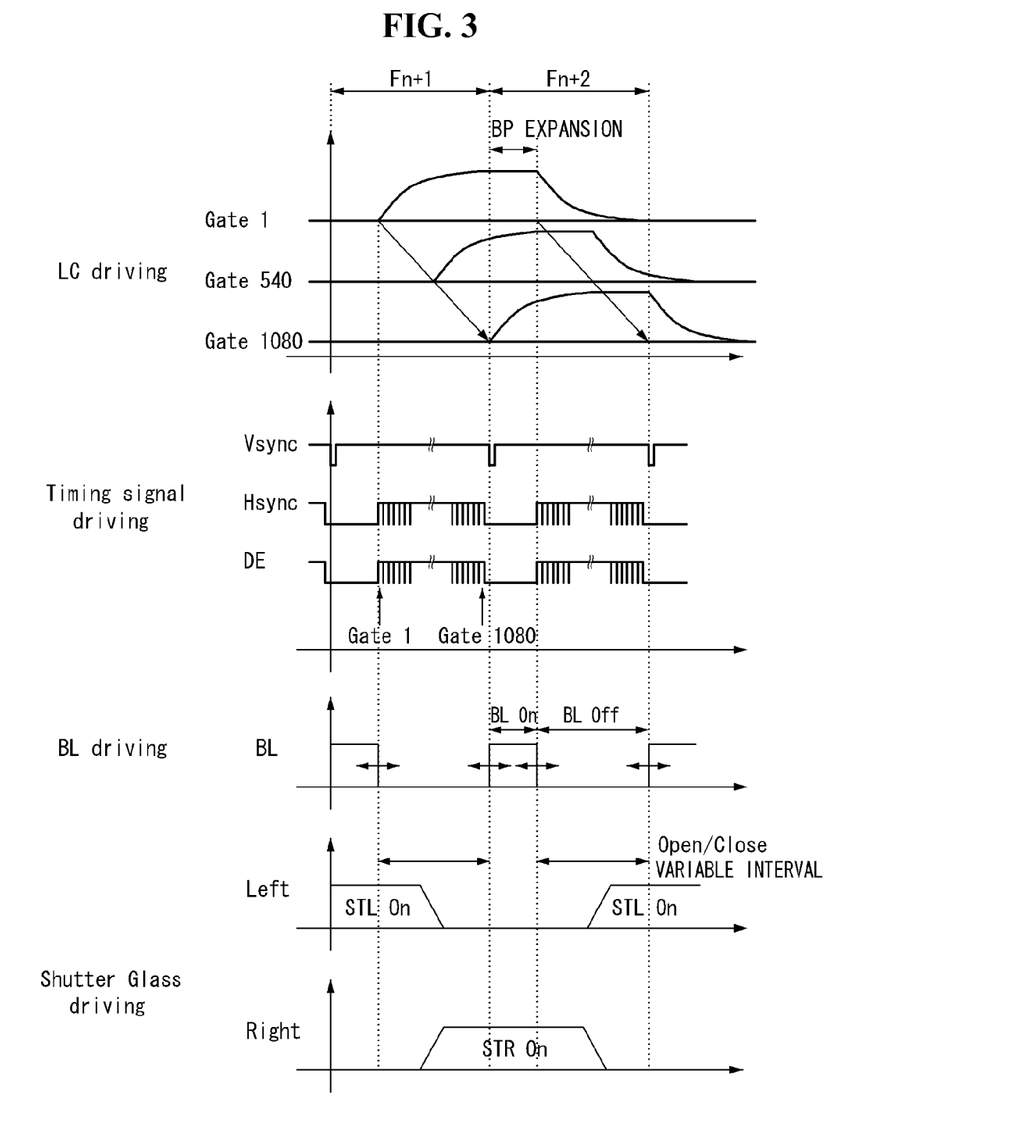
FIG. 3 is an exemplary diagram illustrating driving timings of liquid crystal, driving timings of timing signals, driving timings of light sources, and driving timings of liquid crystal shutter glasses, conforming to the expansion of a vertical blank interval.
Figure 4:
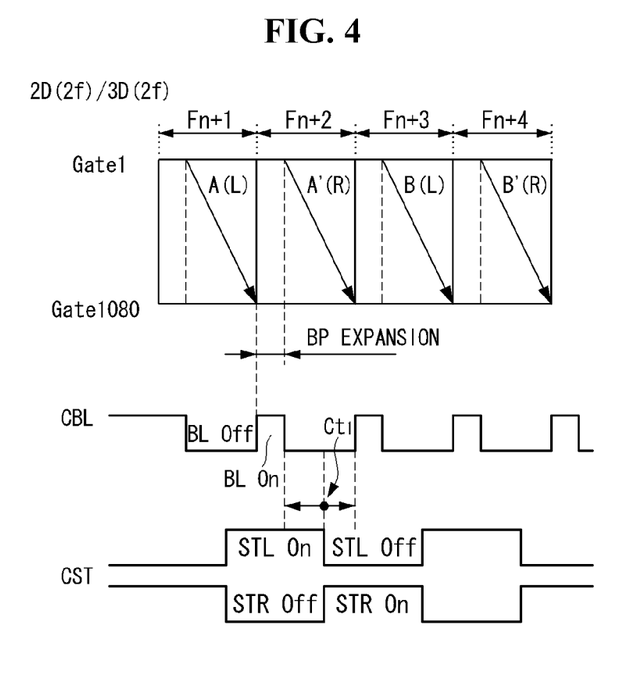
FIG. 4 is an exemplary diagram illustrating driving timings of a light source control signal and a liquid crystal shutter control signal conforming to addressing timings of frame data.

FIG. 3 is an exemplary diagram illustrating driving timings of the liquid crystal, driving timings of the timing signals, driving timings of the light sources, and driving timings of the liquid crystal shutter glasses, conforming to the expansion of a vertical blank interval. FIG. 4 is an exemplary diagram illustrating driving timings of the light source control signal CBL and the liquid crystal shutter control signal CST conforming to addressing timings of frame data.

Referring to FIGS. 3 and 4, the image display device according to an embodiment of this document expands a back porch BP included in the vertical blank interval. Here, the data addressing begins when the data enable signal DE is a high level and stops when the data enable signal DE is a low level. The data enable signal DE changes its logic levels in synchronization with, for example, the horizontal synchronizing signal Hsync. The vertical blank interval corresponds to a interval when the low level of the data enable signal DE lasts relatively long. The back porch BP is defined as a time from a point of time when one frame period starts to a point of time when the data enable signal DE initially enters the high level. The controller 11 can expand the back porch BP by delaying the point of time when the data enable signal DE initially enters the high level every frame. If the back porch BP is expanded, a time taken to address the frame data is reduced in one frame. Thus, it is necessary to increase a data transmission frequency so as to compensate the reduced time for normally displaying data. In addition, data is sequentially from the upper part of the liquid crystal display panel 10 to the lower part thereof, and thus the liquid crystal placed in the lower part of the panel, which lies in the latter addressing order, is delayed in the response as compared with the liquid crystal placed in the upper part the panel. Therefore, when a time taken to address the data is reduced by expanding the pack porch BP, a time for the response of the liquid crystal is correspondingly increased in one frame period. At this time, if the light sources are turned on during the expanded back porch BP, when 2D images are implemented, the MPRT are greatly improved, and particularly, uniformity of the MPRT in the entire liquid crystal display panel 10 becomes better. Of course, depending on a design specification considering a timing margin, the turned-on interval of the light sources may overlap with the expanded back porch BP, and may be wider than the back porch BP interval by a predetermined width.

The image display device further comprises the liquid crystal shutter glasses 16 for implementing 3D images, and simultaneously and alternately opens and closes a left eye shutter STL and a right eye shutter STR of the liquid crystal shutter glasses 16 at a cycle of one frame period. In other words, the left eye shutter STL is opened during the turned-on period of the light sources for display of the left eye data L and simultaneously the right eye shutter STR is closed. In addition, the right eye shutter STR is opened during with the turned-on period of the light sources for display of right eye data R and simultaneously the left eye shutter STL is closed. At this time, the opening and closing point Ct1 of the shutters STL and STR is positioned in the periods when the light sources are turned off. In this way, if the turned-on timing of the light sources is adjusted along with the adjustment of the shutter opening timing, the 3D crosstalk can be considerably lowered. In addition, since the opening and closing point Ct1 of the shutters STL and STR is set to be positioned in the periods when the light sources are turned off, a timing margin can be notably improved when designing the opening and closing point Ct1 in consideration of the response of the liquid crystal in the liquid crystal shutter glasses 16.

Figure 5:
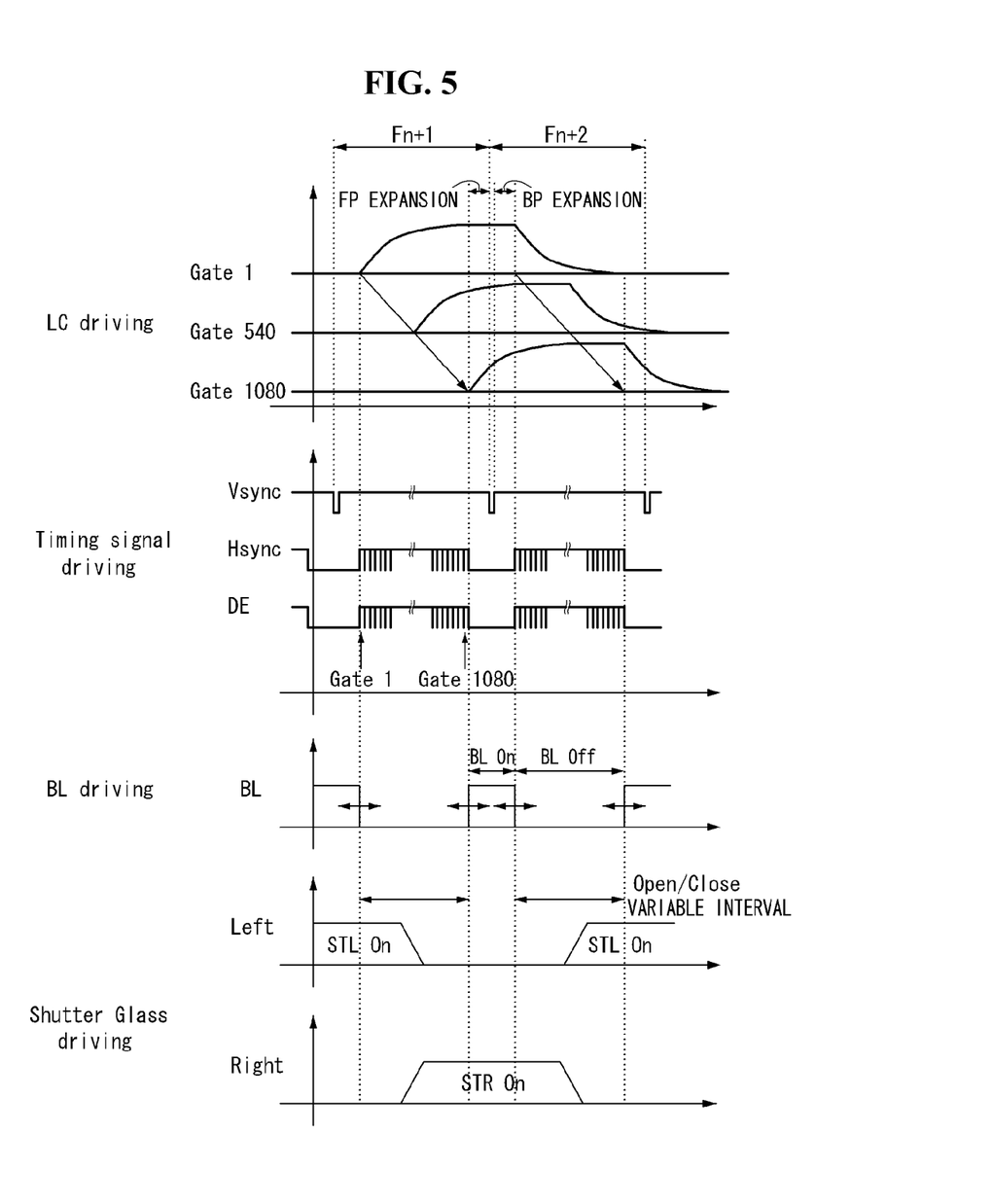
FIG. 5 is another exemplary diagram illustrating driving timings of liquid crystal, driving timings of timing signals, driving timings of light sources, and driving timings of liquid crystal shutter glasses, conforming to the expansion of a vertical blank interval.
Figure 6:
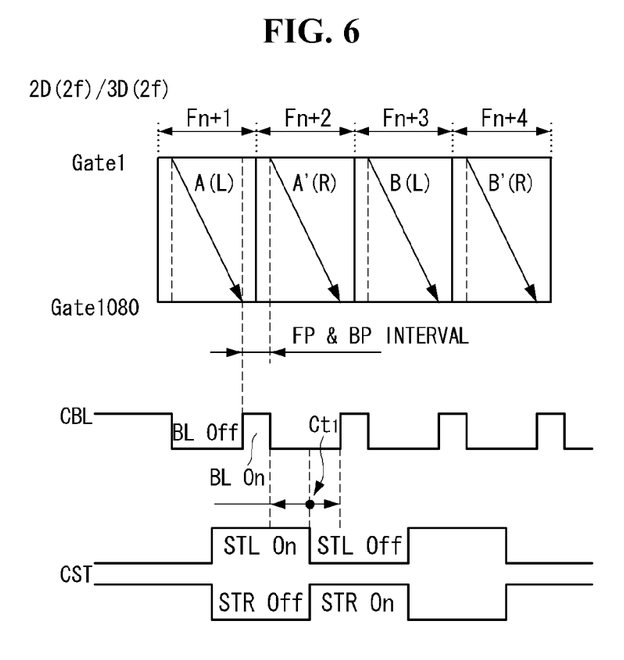
FIG. 6 is another exemplary diagram illustrating driving timings of a light source control signal and a liquid crystal shutter control signal conforming to addressing timings of frame data.

FIG. 5 is another exemplary diagram illustrating driving timings of the liquid crystal, driving timings of the timing signals, driving timings of the light sources, and driving timings of the liquid crystal shutter glasses, conforming to the expansion of a vertical blank interval. FIG. 6 is another exemplary diagram illustrating driving timings of the light source control signal CBL and the liquid crystal shutter control signal CST conforming to addressing timings of frame data.

Referring to FIGS. 5 and 6, the image display device according to another example of this document expands a front porch FP along with the back porch BP, both of which are included in the vertical blank interval. The front porch FP is defined as a time from a point of time when the data enable signal DE is changed into the low level in one frame period to a point of time when the one frame period ends. The front porch FP is expanded by making earlier the point of time when the data enable signal DE is changed into the low level in one frame, and the back porch BP is expanded by delaying the time of point when the data enable signal DE initially enters the high level in one frame. The operation and effect obtained by expanding the back porch BP and the front porch F P are substantially the same as those obtained by expanding the back porch BP.

As described above, the image display device according to the embodiments of this document can improve the MPRT when 2D images are implemented, and prevent 3D crosstalk from being generated when 3D images are implemented, thereby greatly improving the display quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims.

What is claimed is:

1. An image display device, comprising:
   a liquid crystal display panel configured to selectively implement 2D images and 3D images;
   panel driving circuits configured to drive the liquid crystal display panel;
   a backlight configured to include a plurality of light sources and supply light to the liquid crystal display panel; and
   a controller including:
      a data processing circuit configured to select any one of a 2D image data and a 3D image data, interpolate the 2D image data to generate a first frame data having a N multiple 2D image data synchronized with a N multiple frame frequency having a left eye data and a right eye data synchronized with the N multiple frame frequency when the 3D image data is selected, and expand a vertical blank interval where the first and second frame data are not displayed; and
      a timing controller configured to rearrange the first and second frame data to be suitable for a resolution of the liquid crystal display panel, wherein N is a positive integer equal to or more than 2,
   wherein the data processing circuit expands a front porch by making earlier a point of time when a data enable signal is changed to a low level if the 3D image data is selected, which instructs to stop addressing the first and second frame data in one frame period, and increases a transmission frequency of the first and second frame data without decreasing the N multiple frame frequency.

2. The image display device of claim 1, wherein the backlight is turned on during the expanded vertical blank interval and turned off during the remaining interval, and wherein the front porch is included in the vertical blank interval.

3. The image display device of claim 1, wherein the controller expands a back porch by delaying a point of time when the data enable signal initially enters a high level, which instructs to begin addressing the first and second frame data in one frame period, and increases a transmission frequency of the first and second frame data.

4. The image display device of claim 1, further comprising liquid crystal shutter glasses having a left eye shutter and a right eye shutter which are reversely opened and closed to each other during a turned-off period of the backlight, in order to implement the 3D images.

5. The image display device of claim 4, wherein the controller further comprises a light source control circuit configured to generate a light source control signal for controlling the turning-on and the turning-off periods of the backlight, wherein the turning-on period overlaps with the expanded vertical blank interval.

6. The image display device of claim 5, wherein the data processing circuit comprises:
   a 3D data processing circuit having a 3D data division circuit configured to block the 2D image data and divide the 3D image data to generate the second frame data, in response to a first logic level of an input selection signal, and, block the input image data and bypass the 2D image data in response to a second logic level of the selection signal; and
   a 2D data processing circuit having a 2D data interpolation circuit configured to bypass the 3D frame data output from the 3D data processing circuit to the timing controller in response to the first logic level of the selection signal, and interpolate the 2D image data bypassed from the 3D data processing circuit to generate the first frame data in response to the second logic level of the selection signal.

7. The image display device of claim 6, wherein the 3D data processing circuit further generates a liquid crystal shutter control signal for opening and closing the left eye shutter and the right eye shutter, and wherein the liquid crystal shutter control signal is generated based on logic levels of the light source control signal.

* * * * *